US008755686B2

(12) United States Patent
Fu (10) Patent No.: US 8,755,686 B2
(45) Date of Patent: Jun. 17, 2014

(54) METHOD AND DEVICE FOR PROCESSING FAILURE OF MULTI-SPAN WORKING CHANNEL IN RING OPTICAL TRANSMISSION NETWORK

(75) Inventor: Sen Fu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 101 days.

(21) Appl. No.: 13/380,866

(22) PCT Filed: Sep. 23, 2009

(86) PCT No.: PCT/CN2009/074146
§ 371 (c)(1),
(2), (4) Date: Dec. 26, 2011

(87) PCT Pub. No.: WO2011/000181
PCT Pub. Date: Jan. 6, 2011

(65) Prior Publication Data
US 2012/0099853 A1    Apr. 26, 2012

(30) Foreign Application Priority Data

Jul. 2, 2009    (CN) .......................... 2009 1 0148740

(51) Int. Cl.
| | | |
|---|---|---|
| G02F 1/00 | (2006.01) | |
| G02F 2/00 | (2006.01) | |
| H01S 3/00 | (2006.01) | |
| H04B 10/00 | (2013.01) | |
| H04J 14/00 | (2006.01) | |
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04J 3/16 | (2006.01) | |
| H04J 3/08 | (2006.01) | |
| H04Q 11/00 | (2006.01) | |

(52) U.S. Cl.
CPC ... *H04Q 11/0062* (2013.01); *H04Q 2011/0081* (2013.01); *H04J 2203/006* (2013.01); *H04Q 2011/0092* (2013.01); *H04J 3/1652* (2013.01); *H04J 3/085* (2013.01)
USPC .............................. 398/3; 370/217; 370/222

(58) Field of Classification Search
USPC ......................................................... 398/3–5
See application file for complete search history.

(56) References Cited

U.S. PATENT DOCUMENTS

| | | | | |
|---|---|---|---|---|
| 7,715,713 | B1 * | 5/2010 | Iyer et al. ........................ | 398/58 |
| 2002/0118410 | A1 * | 8/2002 | Manganini et al. ........... | 359/110 |
| 2003/0009599 | A1 * | 1/2003 | Lee et al. ...................... | 709/251 |
| 2003/0120799 | A1 * | 6/2003 | Lahav et al. .................. | 709/236 |
| 2003/0169470 | A1 * | 9/2003 | Alagar et al. ................. | 359/110 |
| 2004/0111651 | A1 | 6/2004 | Mukherjee et al. | |
| 2009/0290867 | A1 * | 11/2009 | Zhao ............................... | 398/5 |

FOREIGN PATENT DOCUMENTS

| | | |
|---|---|---|
| CN | 1713548 A | 12/2005 |
| CN | 1808950 A | 7/2006 |
| JP | 2004517550 A | 6/2004 |
| JP | 2008092130 A | 4/2008 |

OTHER PUBLICATIONS

International Search Report for PCT/CN2009/074146 dated Mar. 15, 2010.

\* cited by examiner

*Primary Examiner* — David Payne
*Assistant Examiner* — Casey Kretzer
(74) *Attorney, Agent, or Firm* — Ling Wu; Stephen Yang; Ling and Yang Intellectual Property LLC (57) ABSTRACT

The present invention discloses a method and device for processing an alarm in a ring optical transport network. The method comprises detecting alarm information in the ring network in real-time, and when generation of only an working ODUk alarm in the ring network is detected, performing a switching process of a 1+1 protection protocol on services carried on a working channel on which an alarm is generated; in the event that one working ODUk alarm has existed in the ring network, when generation of an alarm at a protection ODUk corresponding to the working ODUk on which the alarm has been generated is also detected, or when an optical multiplexed segment layer alarm is generated in the ring network, triggering a switching process of a channel shared protection protocol. The device comprises an alarm detection module and a switching triggering module.

8 Claims, 6 Drawing Sheets

METHOD AND DEVICE FOR PROCESSING FAILURE OF MULTI-SPAN WORKING CHANNEL IN RING OPTICAL TRANSMISSION NETWORK

TECHNICAL FIELD

The present invention relates to the ring network protection technique in the Optical Transport Network (OTN), and in particular, to a method and device for processing failures of a multi-span segment working channel in a ring OTN.

BACKGROUND OF THE RELATED ART

The OTN is a transport network which is on the basis of the wavelength division multiplexing technology and in the optical layer organization network, and is the next generation backbone transport network. For the OTN, since the rate of the transmitted signals is higher, the amount of carried information is larger, and the wavelength/sub-wavelength service scheduling capability is provided, thus network protection of the OTN becomes more important for traditional network protection, and the protection capability is also stronger.

In the OTN, an ODUk (Optical Data Unit k) layer generally is required to provide end to end sub-network link protection. At present, protection methods commonly used in the industry include 1+1 protection, 1:n protection and channel shared protection, etc. In selecting a protection scheme, a choice is often required to be made based on bandwidth utilization ratio, protection robustness and switching time.

The 1+1 protection may provide a dedicated backup channel for each sub-network link, and same signals are transmitted in a working channel and a protection channel. Thus such protection method has the strongest robustness and the shortest switching time. However, the bandwidth utilization ratio is only 50%, and the bandwidth is wasted severely in the case of very low network alarm ratio.

Figure 1:
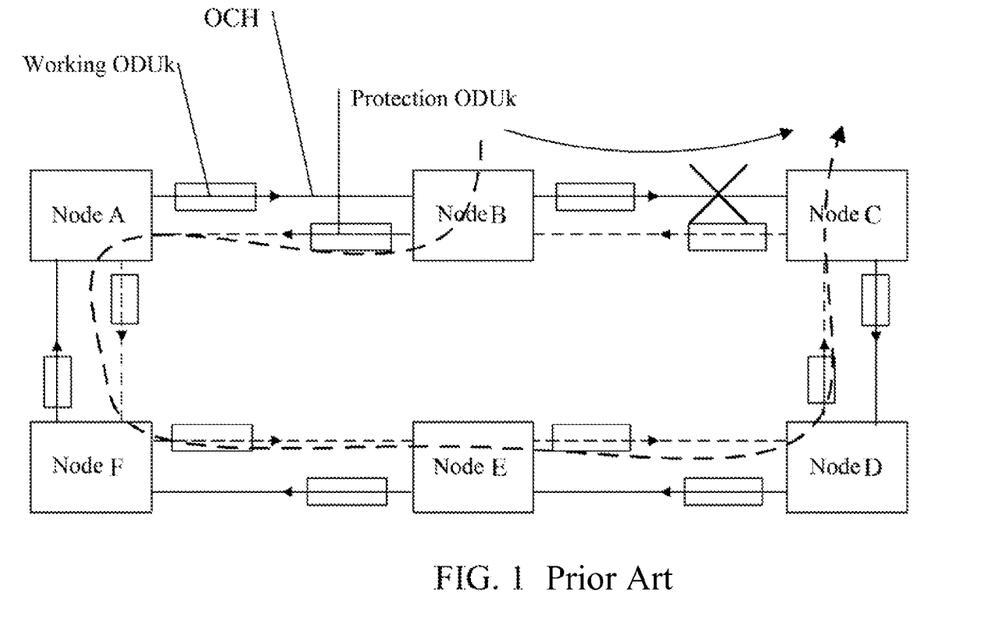
FIG. 1 is a schematic diagram of a case where service protection is performed using a channel shared protection way when a single ODUk alarm occurs in a ring network.
Figure 2:
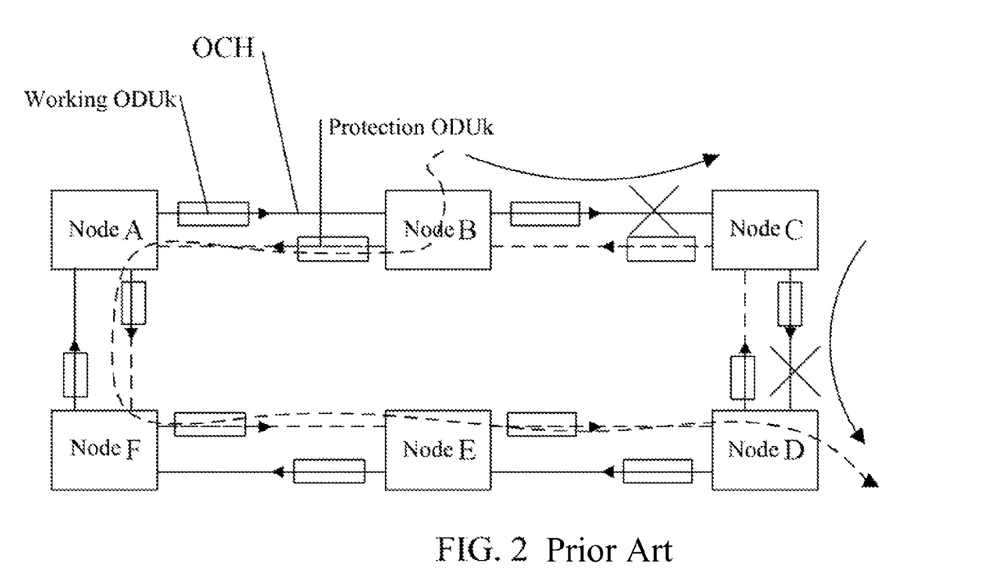
FIG. 2 is a schematic diagram of a case where a channel shared protection way cannot be used to perform service protection when multiple ODUk alarms occur in a ring network.

The channel shared protection is a protection method where all services share backup resources and is applied in the ring network, thus its bandwidth utilization ratio is much higher than that of the 1+1 protection method. Its robustness is also higher than that of the 1:n protection, since working resources and protection resources are separated. However, when the nodes in the ring gradually increase, its stability is decreased thereupon too. Especially when alarms occur at multiple ODUks, a phenomenon of service misconnection will occur; even if misconnection does not occur, for the alarms occurring at multiple ODUks, the channel shared backup resources can only provide one service for switching such that a plurality of services with failures can not be protected simultaneously. FIG. 1 is a schematic diagram of a case where service protection is performed using a channel shared protection way when a single ODUk alarm occurs in the ring network. It can be seen from the figure that services will be triggered to switch at two ends when an alarm of an Optical Channel (OCH) layer is detected, and services that are also clockwise (anticlockwise) share the same inverse anticlockwise (clockwise) ring channel. FIG. 2 is a schematic diagram of a case where a channel shared protection way cannot be used to perform service protection when multiple ODUk alarms occur in the ring network. It can be seen from the figure that if two or more ODUk alarms are detected in a direction, for example, in a clockwise ring, the channel shared protection is unable to switch more than two services to the shared protection channel, resulting in protection failure.

SUMMARY OF THE INVENTION

The present invention provides a method and a device for processing failures of a multi-span segment working channel in a ring OTN so as to solve the problem in the prior art of the channel shared protection failure when multiple ODUk alarms occur simultaneously in a ring network.

The present invention provides a method for processing failures of a multi-span segment working channel in a ring optical transport network (OTN) comprising steps of:

detecting alarm information in the ring optical transport network in real-time, and when generation of only an working Optical Data Unit k (ODUk) alarm in the ring optical transport network is detected, performing a switching process of a 1+1 protection protocol on services carried on a working channel on which an alarm is generated;

in the event that one working ODUk alarm has existed in the ring optical transport network, when generation of an alarm at a protection ODUk corresponding to the working ODUk on which the alarm has been generated in the ring optical transport network is also detected, or when an optical multiplexed segment layer alarm is generated in the ring optical transport network, triggering a switching process of a channel shared protection protocol.

Furthermore, the method further comprises: when generation of only a protection ODUk alarm in the ring optical transport network is detected, filtering the protection ODUk alarm.

Furthermore, after the step of performing the switching process of the 1+1 protection protocol on services carried on the working channel on which the alarm is generated, the add and drop nodes of a span segment where each working ODUk alarm is situated are in a 1+1 switching state.

Furthermore, after the step of triggering the switching process of the channel shared protection protocol, the nodes of the span segment where the optical multiplexed segment layer alarm or protection ODUk alarm is situated are in an A direction switching state or a B direction switching state, nodes by which a protection channel passes is in a pass-through state.

Furthermore, the method further comprises: when disappearance of the working ODUk alarm is detected, determining whether a corresponding protection ODUk is in a failure-free state at this time, if yes, performing a reply process of the 1+1 protection protocol on services carried on a protection channel, each node on the protection channel being recovered to an idle state, otherwise, triggering a reply process of the channel shared protection protocol, each node on the protection channel being recovered to the idle state.

Furthermore, the method further comprises: when disappearance of the optical multiplexed layer alarm is detected, triggering the reply process of the channel shared protection protocol, each node on a protection channel being recovered to an idle state.

Furthermore, the method further comprises: when disappearance of the protection ODUk alarm is detected, updating the states of a protection group only.

The present invention further provides a device for processing failures of a multi-span segment working channel in a ring optical transport network comprising an alarm detection module and a switching triggering module, wherein the alarm detection module is configured to detect alarm information in the ring optical transport network in real-time, and send the detected alarm information to the switching triggering module; and the switching triggering module is configured to, when the alarm detection module detects that only an working ODUk alarm is generated in the ring optical transport network, perform a switching process of a 1+1 protection protocol on services carried on a working channel on which the alarm is generated; and in the event that one working ODUk alarm has existed in the ring optical transport network, when the alarm detection module detects that an alarm is also generated at a protection ODUk corresponding to the working ODUk on which the alarm has been generated in the ring optical transport network, or when an optical multiplexed segment layer alarm is generated in the ring optical transport network, trigger a switching process of a channel shared protection protocol.

Furthermore, the device further comprises:

an alarm disappearance detection module configured to detect alarm disappearance information in the ring optical transport network in real-time, and send the detected alarm disappearance information to the switching triggering module.

Furthermore, the switching triggering module is further configured to:

when the alarm disappearance detection module detects disappearance of the working ODUk alarm, determine whether a corresponding protection ODUk is in a failure-free state at this time, and if yes, perform a reply process of the 1+1 protection protocol on services carried on a protection channel, otherwise, trigger a reply process of the channel shared protection protocol; and when the alarm disappearance detection module detects disappearance of the optical multiplexed layer alarm, trigger a reply process of the channel shared protection protocol.

The beneficial effects of the present invention will be described below.

The technical scheme of the present invention can solve the problem in the prior art of the channel shared protection failure when multiple ODUk alarms occur simultaneously in the ring network without increasing link resources, can perform the 1+1 protection for multiple ODUk services simultaneously, and provide the link separated channel shared protection in the case of protection resource failure, thereby greatly increasing the robustness of protection in the ring network topology.

PREFERRED EMBODIMENTS OF THE PRESENT INVENTION

A specific implementation process in accordance with the present invention will be described in detail in conjunction with the accompanying figures.

Figure 3:
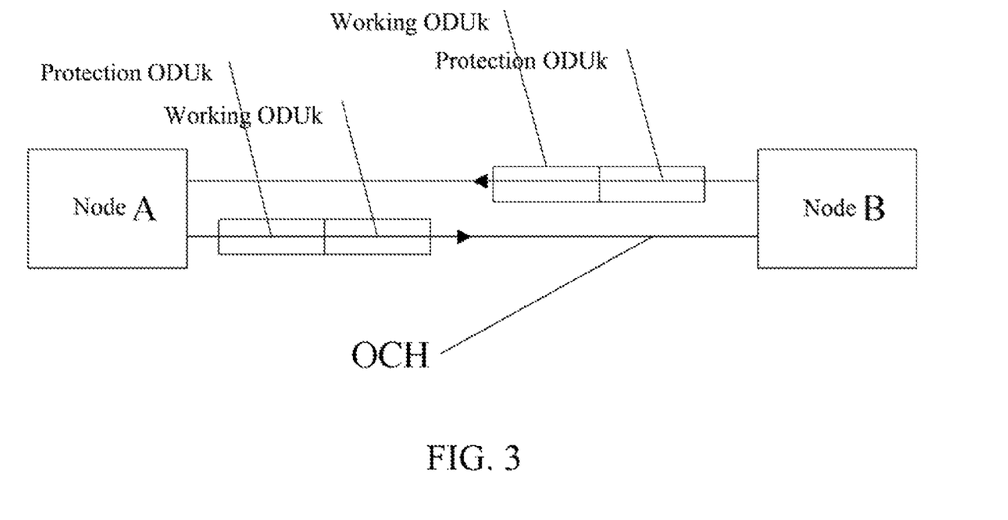
FIG. 3 is a schematic diagram of a working ODUk and a protection ODUk configured in the same optical channel.
Figure 4:
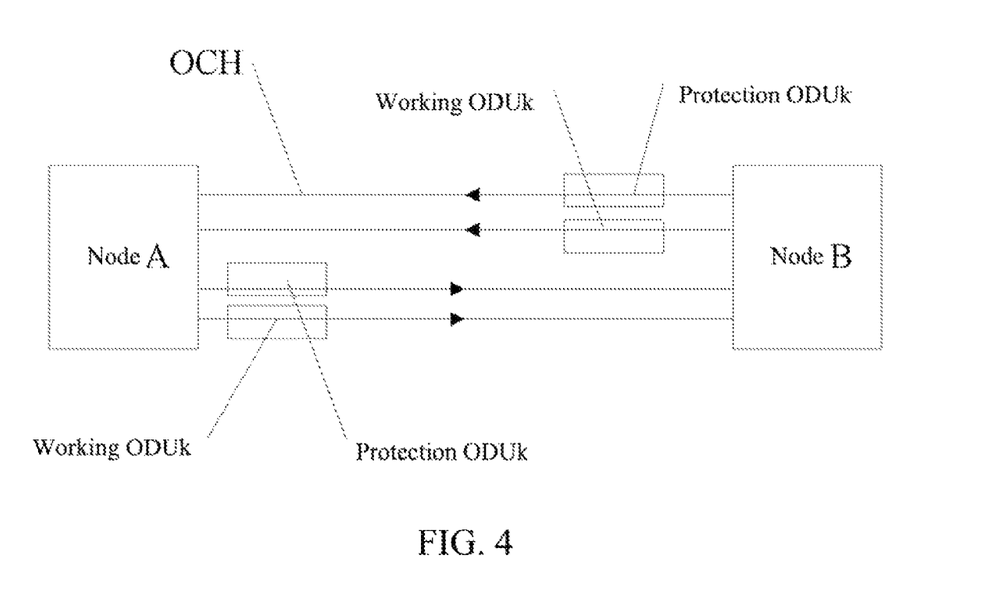
FIG. 4 is a schematic diagram of a working ODUk and a protection ODUk configured in different optical channels.

In the OTN network, based on the strong crossover capability of an ODUk, ODUk signals can be crossed to any wavelength channel in any direction. A working ODUk and a protection ODUk may be configured to share one optical channel, as shown in FIG. 3, the working ODUk and the protection ODUk may also be separated from each other and are configured in different optical channels, as shown in FIG. 4. The present invention uses the ODUk's crossover capability on any wavelength channel in any direction to extend the fifth node state, 1+1 switching state, based on four node states, an idle state, an A direction switching state, a B direction switching state and a pass-through state in channel shared protection of the ring network. Since the channel shared protection protocol utilizes protection channel resources which are in the opposite direction to the services in the ring, the 1+1 protection protocol's utilization of protection channel resources which are in the same direction as the services in the ring is increased.

The core concept of the present invention is that: when only a working ODUk alarm is detected, the 1+1 protection with the same direction and same destination as the services is triggered instead of switching to the shared protection resources in the opposite direction. Thus multiple alarms in a ring in a certain direction can correspond to their respective 1+1 protection, thereby not causing protection resource conflict. When an alarm is also detected at the protection ODUk or an OMS layer alarm is detected, the 1+1 protection has failed at this time, the channel shared protection is required to be triggered, and shared protection resources in a ring in the opposite direction are occupied.

Figure 5:
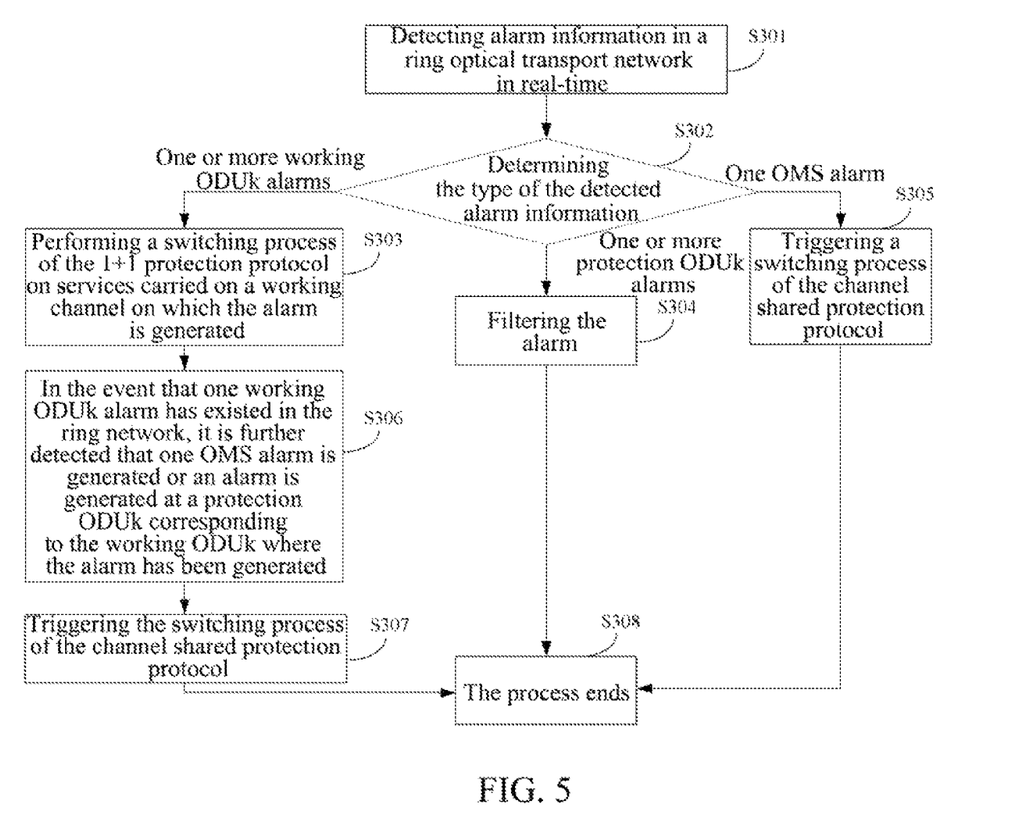
FIG. 5 is a flow chart of a processing method when generation of an alarm in a ring OTN is detected according to the present invention.

Referring to FIG. 5, which is a flow chart of a processing method when generation of an alarm in a ring OTN is detected according to the present invention. The method mainly comprises the following steps.

Step S301, alarm information in the ring optical transport network is detected in real-time.

Step S302, the type of the detected alarm information is determined, when generation of one or more working ODUk alarms in the ring network is detected, step S303 is performed, when generation of one or more protection ODUk alarms in the ring network is detected, step S304 is performed, and when generation of only one OMS alarm in the ring network is detected, step S305 is performed.

Step S303, a switching process of the 1+1 protection protocol is performed on services carried on a working channel on which the alarm is generated, add and drop nodes of a span segment where each working ODUk alarm is situated are in a 1+1 switching state, and step S306 is performed.

Step S304, this alarm is filtered, and step S308 is performed.

Step S305, a switching process of the channel shared protection protocol is triggered, the add and drop nodes of a span segment where the OMS alarm is situated are in an A direction switching state or a B direction switching state, the nodes by which the protection channel passes are in a pass-through state, and step S308 is performed.

Step S306, in the event that one working ODUk alarm has existed in the ring network, when generation of one OMS alarm is detected or when an alarm is generated at the protection ODUk corresponding to the working ODUk where the alarm has been generated, the next step is performed.

Step S307, the switching process of the channel shared protection protocol is triggered, the add and drop nodes of the span segment where the OMS alarm or the protection ODUk alarm is situated are in the A direction switching state or the B direction switching state, the node by which the protection channel passes is in the pass-through state, and step S308 is performed.

Step S308, the process ends.

Figure 6:
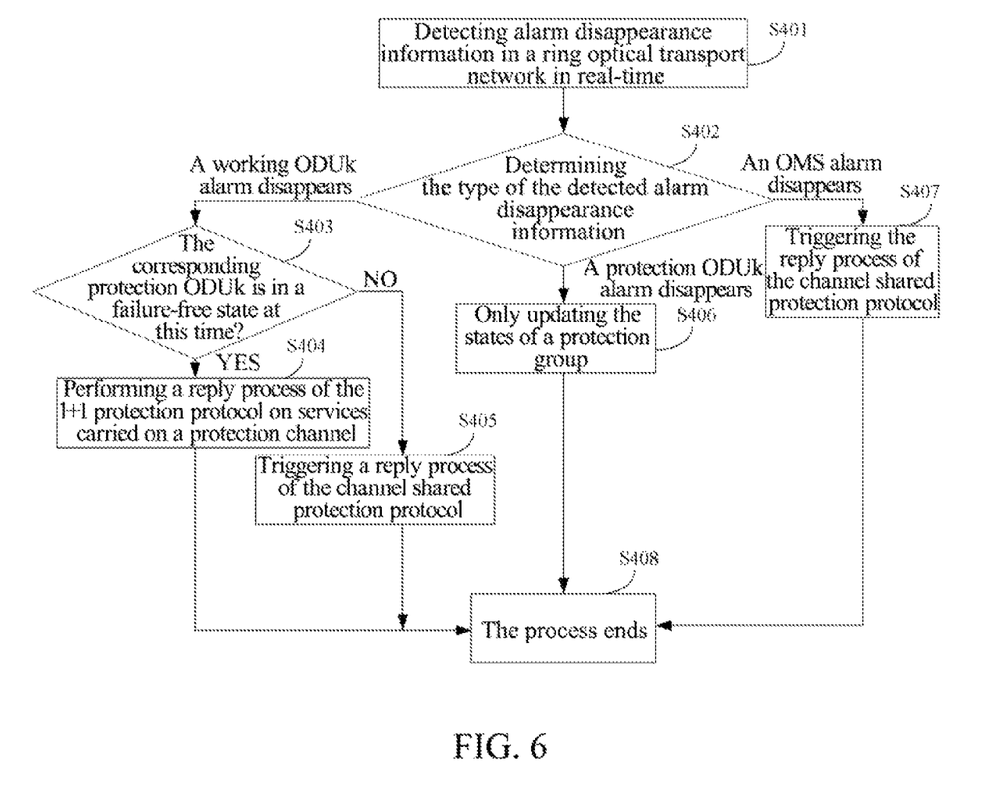
FIG. 6 is a flow chart of a processing method when disappearance of an alarm in a ring OTN is detected according to the present invention.

Referring to FIG. 6, which is a flow chart of a processing method when disappearance of an alarm in a ring OTN is detected according to the present invention. The method mainly comprises the following steps.

Step S401, alarm disappearance information in the ring optical transport network is detected in real-time.

Step S402, the type of the detected alarm disappearance information is determined, when working ODUk alarm disappearance information is detected, step S403 is performed, when protection ODUk alarm disappearance information is detected, step S406 is performed, and when OMS alarm disappearance information is detected, step S407 is performed.

Step S403, it is determined whether the corresponding protection ODUk is in a failure-free state at this time, and if yes, step S404 is performed, otherwise step S405 is performed.

Step S404, a reply process (Revert process, release protection, and a procedure of recovering to working resources) of the 1+1 protection protocol is performed on services carried on the protection channel, each node on the protection channel is recovered to an idle state, and step S408 is performed.

Step S405, a reply process of the channel shared protection protocol is triggered, each node on the protection channel is recovered to the idle state, and step S408 is performed.

Step S406, only the states of a protection group is updated, and step S408 is performed.

Step S407, the reply process of the channel shared protection protocol is triggered, each node on the protection channel is recovered to the idle state, and step S408 is performed.

Step S408, the process ends.

Figure 7:
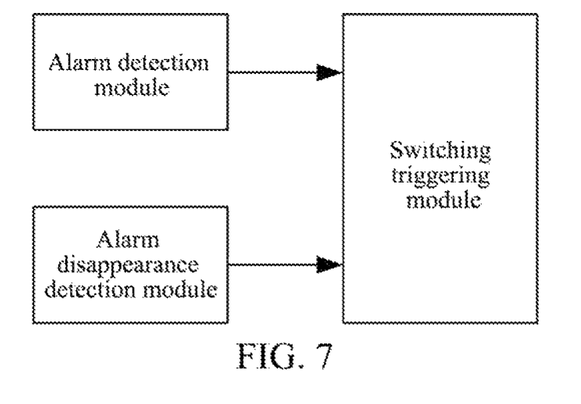
FIG. 7 is a block diagram of a device for processing an alarm in a ring network according to the present invention.

Corresponding to the above-described method in accordance with the present invention, the present invention further provides a device for processing an alarm in a ring OTN. Referring to FIG. 7, which is a block diagram of a device for processing an alarm in a ring network according to the present invention. The device mainly comprises an alarm detection module, an alarm disappearance detection module and a switching triggering module.

The alarm detection module is configured to detect alarm information in the ring optical transport network in real-time, and send the detected alarm information to the switching triggering module.

The alarm disappearance detection module is configured to detect alarm disappearance information in the ring optical transport network in real-time, and send the alarm disappearance information to the switching triggering module.

The switching triggering module is configured to, when the alarm detection module detects that only an working ODUk alarm is generated in the ring optical transport network, perform a switching process of a 1+1 protection protocol on services carried on a working channel on which the alarm is generated; and in the event that one working ODUk alarm has existed in the ring optical transport network, when the alarm detection module detects that an OMS alarm is also generated in the ring optical transport network, or when an alarm is generated at a protection ODUk corresponding to the working ODUk on which the alarm has been generated, trigger a switching process of a channel shared protection protocol.

When the alarm disappearance detection module detects disappearance of the working ODUk alarm, the switching triggering module is further configured to determine whether the corresponding protection ODUk is in a failure-free state at this time, if yes, perform a reply process of the 1+1 protection protocol on the services carried on the protection channel, otherwise, trigger the reply process of the channel shared protection protocol. When the alarm disappearance detection module detects disappearance of the OMS alarm, the switching triggering module is further configured to trigger the reply process of the channel shared protection protocol.

The method and device in accordance with the present invention can perform 1+1 protection for multiple ODUk services simultaneously without increasing link resources, and provide the link separated channel shared protection in the case of protection resource failure, thereby greatly increasing the robustness of the protection in the ring network topology.

The present invention will be further described in detail in conjunction with one specific embodiment.

Figure 8:
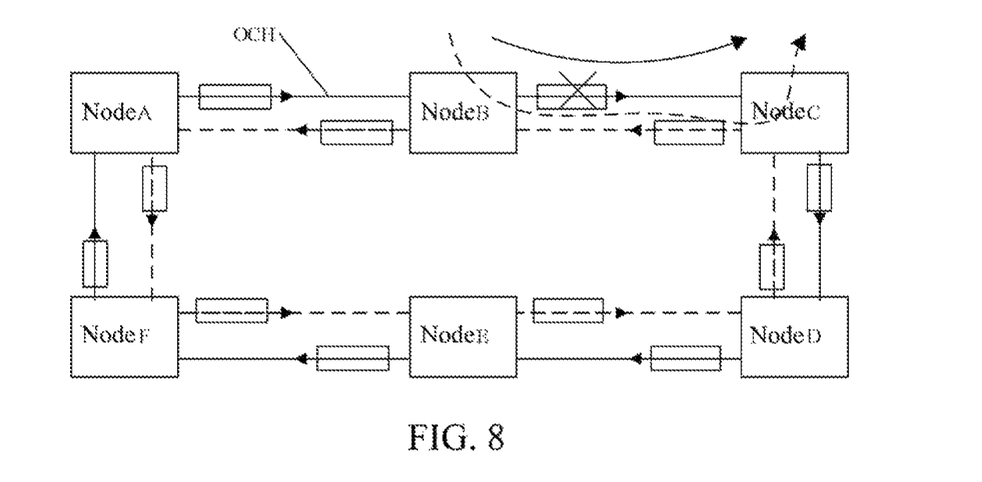
FIG. 8 is a schematic diagram of failure occurrence in a working channel of a span segment where Service 1 is situated according to one embodiment of the present invention.
Figure 9:
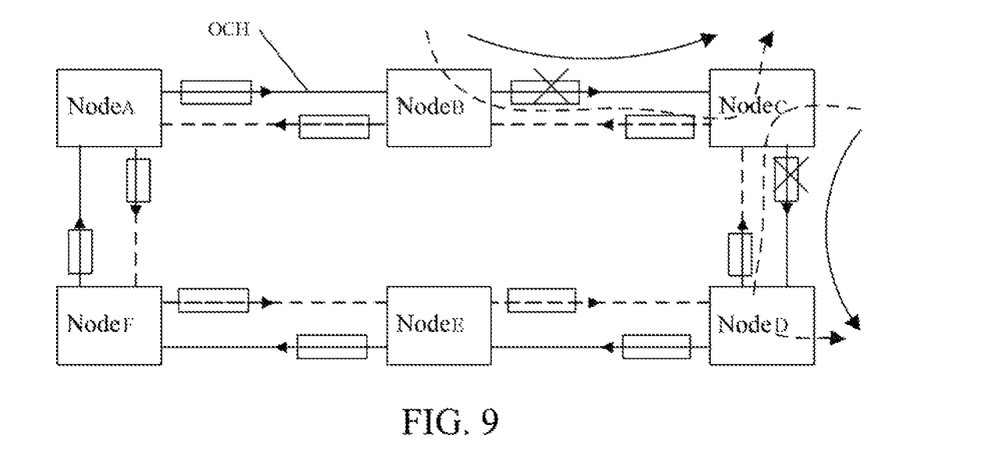
FIG. 9 is a schematic diagram of simultaneous failure occurrences in working channels of span segments where Service 1 and Service 2 are situated according to one embodiment of the present invention.
Figure 10:
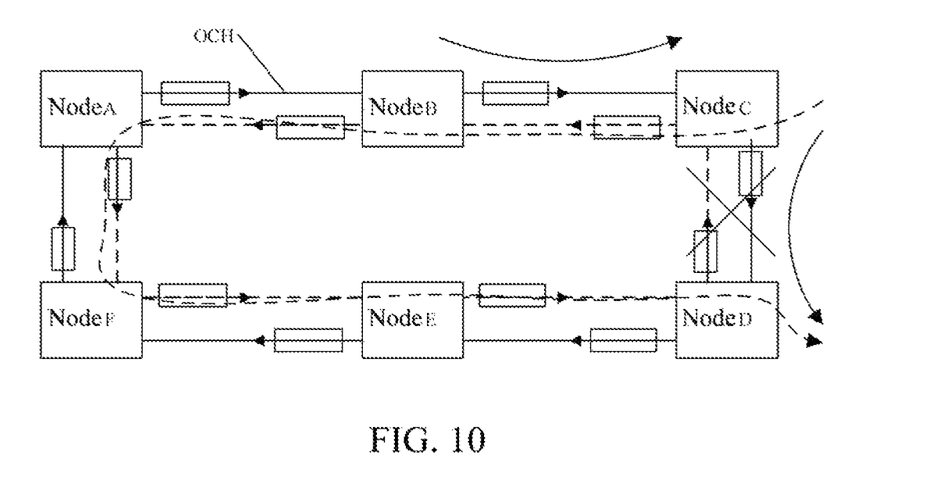
FIG. 10 is a schematic diagram of failure occurrence in a span segment where Service 2 is situated according to one embodiment of the present invention.

Referring to FIG. 8-10, where nodes A-F forms a ring network topology, a pair of services, denoted as Service 1, exists between Node B and Node C, one service, denoted as Service 2, exists between Nodes C and D. Using the method for processing the alarm according to the present invention, when a failure occurs in a working channel of a span segment where Service 1 is situated, as shown in FIG. 8, following operations are performed.

Step S601, Node C enters into an alarm analysis process after detecting the alarm, determines that the failure occurs only in the working channel, performs thus the 1+1 protection scheme to send the protection protocol to the opposite Node B, and performs 1+1 switching.

Step S602, Node B receives the protection protocol of Node C, triggers a 1+1 switching state, and sends a response protocol to Node C.

Step S603, Node C receives the response protocol, and the system is in a stable state.

After the system is stabilized, the failure occurs in a working channel of a span segment where Service 2 is situated, as shown in FIG. 9, and following operations are performed.

Step S604, Node D enters into an alarm analysis process after detecting the alarm, determines that the failure occurs only in the working channel, performs thus the 1+1 protection scheme to send the protection protocol to the opposite Node C, and performs 1+1 switching.

Step S605, Node C receives the protection protocol of Node D, triggers a 1+1 switching state, and sends a response protocol.

Step S603, Node D receives the response protocol, and the system is in a stable state.

Node B is recovered to an idle state after the failure on the span segment where Service 1 is situated disappears. When the failure occurs in the span segment where Service 2 is situated at this time, an OMS alarm is generated and reported, as shown in FIG. 10, and the following operations are performed.

Step S607, Node D detects the OMS alarm, enters into a alarm analysis process, triggers the channel shared protection scheme, and sends the protection protocol to other nodes in the topology.

Step S608, after the channel shared protocol is stabilized in the system, Node C is in a B direction switching state, Node D is in an A direction switching state, and Node A, Node B, Node E and Node F are all in a pass-through state.

According to the embodiments described above, the present invention is able to effectively process the problem of protection failure when failures exist in more than two working channels simultaneously in the channel shared protection, and improves the network survivability without increasing network resources.

Obviously, various modifications and variations to the present invention may be made by those skilled in the art without departing from the spirit or scope of the present invention. Thus, if such modifications and variations of the present invention fall into the scope of the claims of the present invention and their equivalent techniques, it is intended that the present invention include these modifications and variations.

INDUSTRIAL APPLICABILITY

Comparing with the prior art, the technical scheme of the present invention can solve the problem in the prior art of the channel shared protection failure when multiple ODUk alarms occur simultaneously in the ring network without increasing link resources, can perform the 1+1 protection for multiple ODUk services simultaneously, and provide the link separated channel shared protection in the case of protection resource failure, thereby greatly increasing the robustness of protection in the ring network topology.

What is claimed is:

1. A method for processing failures of a multi-span segment working channel in a ring optical transport network (OTN), comprising:
   extending a fifth node state, 1+1 switching state, in addition to four node states, an idle state, an A direction switching state, a B direction switching state and a pass-through state in a channel shared protection of the ring OTN;
   detecting alarm information in the ring OTN in real-time; and
   when generation of only one or more working Optical Data Unit k (ODUk) alarms without any other alarms in the ring OTN is detected, performing a switching process of a 1+1 protection protocol on services carried on a working channel on which an alarm is generated, wherein add and drop nodes of a span segment where each working ODUk alarm is situated are in the 1+1 switching state;
   when there is one working ODUk alarm exist in the ring OTN and one protection ODUk alarm is generated at the protection ODUk corresponding to the said one working ODUk, performing a switching process of a channel shared protection protocol, wherein the add and drop nodes of a span segment where the protection ODUk alarm is situated are in the A direction switching state or the B direction switching state, and the node by which the protection channel passes is in the pass-through state;
   when there is one working ODUk alarm exist in the ring OTN and an optical multiplexed segment (OMS) layer alarm is generated in the ring OTN, performing a switching process of a channel shared protection protocol, wherein the add and drop nodes of a span segment where the OMS layer alarm is situated are in the A direction switching state or the B direction switching state, and the node by which the protection channel passes is in the pass-through state.

2. The method according to claim 1, further comprising: when generation of only a protection ODUk alarm in the ring OTN is detected, filtering the protection ODUk alarm.

3. The method according to claim 1, further comprising: when disappearance of the working ODUk alarm is detected, determining whether a corresponding protection ODUk is in a failure-free state at this time, if yes, performing a reply process of the 1+1 protection protocol on services carried on a protection channel, each node on the protection channel being recovered to the idle state, otherwise, triggering a reply process of the channel shared protection protocol, each node on the protection channel being recovered to the idle state.

4. The method according to claim 1, further comprising: when disappearance of the optical multiplexed layer alarm is detected, triggering a reply process of the channel shared protection protocol, each node on a protection channel being recovered to the idle state.

5. The method according to claim 1, further comprising: when disappearance of the protection ODUk alarm is detected, updating the states of a protection group only.

6. A device for processing failures of a multi-span segment working channel in a ring optical transport network (OTN), comprising an alarm detection module and a switching triggering module, wherein
   the alarm detection module is configured to: extend a fifth node state, 1+1 switching state, in addition to four node states, an idle state, an A direction switching state, a B direction switching state and a pass-through state in a channel shared protection of the ring OTN, detect alarm information in the ring OTN in real-time, and send the detected alarm information to the switching triggering module; and
   the switching triggering module is configured to:
      when the alarm detection module detects that only one or more working ODUk alarms is generated without any other alarms in the ring OTN, perform a switching process of a 1+1 protection protocol on services carried on a working channel on which the alarm is generated, wherein add and drop nodes of a span segment where each working ODUk alarm is situated are in the 1+1 switching state;
      when the alarm detection module detects that there is one working ODUk alarm existed in the ring OTN and one protection ODUk alarm is generated at the protection ODUk corresponding to the said one working ODUk, perform a switching process of a channel shared protection protocol, wherein the add and drop nodes of a span segment where the protection ODUk alarm is situated are in the A direction switching state or the B direction switching state, and the node by which the protection channel passes is in the pass-through state; and
      when the alarm detection module detects that there is one working ODUk alarm existed in the ring OTN and an optical multiplexed segment (OMS) layer alarm is generated in the ring OTN, perform a switching process of a channel shared protection protocol, wherein the add and drop nodes of a span segment where the OMS layer alarm is situated are in the A direction switching state or the B direction switching state, and the node by which the protection channel passes is in the pass-through state.

7. The device according to claim 6, further comprising: an alarm disappearance detection module configured to detect alarm disappearance information in the ring OTN in real-time, and send the detected alarm disappearance information to the switching triggering module.

8. The device according to claim 7, wherein the switching triggering module is further configured to:

when the alarm disappearance detection module detects disappearance of the working ODUk alarm, determine whether a corresponding protection ODUk is in a failure-free state at this time, and if yes, perform a reply process of the 1+1 protection protocol on services carried on a protection channel, otherwise, trigger a reply process of the channel shared protection protocol; and when the alarm disappearance detection module detects disappearance of the optical multiplexed layer alarm, trigger a reply process of the channel shared protection protocol.

\* \* \* \* \*